United States Patent [19]

Fujii

[11] Patent Number: 4,995,580
[45] Date of Patent: Feb. 26, 1991

[54] HEIGHT ADJUSTING DEVICE FOR VEHICLE SEAT

[75] Inventor: Harutoshi Fujii, Akishima, Japan

[73] Assignee: Tachi-S. Co., Ltd., Tokyo, Japan

[21] Appl. No.: 386,917

[22] Filed: Jul. 31, 1989

[51] Int. Cl.⁵ .............................................. F16M 13/00
[52] U.S. Cl. .................................... 248/421; 248/394; 248/396
[58] Field of Search ............... 248/396, 398, 394, 157, 248/421, 422, 423; 297/345, 347

[56] References Cited

U.S. PATENT DOCUMENTS

| | | | |
|---|---|---|---|
| 2,942,647 | 6/1960 | Pickles | 248/394 |
| 3,037,735 | 6/1962 | Matthews | 248/394 |
| 3,724,797 | 4/1973 | Freitag et al. | 248/421 X |
| 3,917,211 | 11/1975 | Daunderer | 248/421 |
| 4,326,690 | 4/1982 | Pickles et al. | 248/396 |
| 4,422,611 | 12/1983 | Kitsuda | 248/394 X |
| 4,778,139 | 10/1988 | Babbs | 248/421 |
| 4,856,763 | 8/1989 | Brodersen et al. | 297/347 X |

FOREIGN PATENT DOCUMENTS 56-28439  3/1981  Japan .

Primary Examiner—Carl D. Friedman
Assistant Examiner—Daniel Hulseberg
Attorney, Agent, or Firm—Browdy and Neimark

[57] ABSTRACT

A height adjusting device for a vehicle seat, in which are provided a height adjusting mechanism and a seat surface inclination adjusting mechanism. The height adjusting mechanism includes a linkage between a seat frame and base frame, with brackets fixed at the seat frame, whereas the seat surface inclination adjusting mechanism includes a tilt link connected with the linkage and bracket of the height adjusting mechainsm in a manner to be movable independently of the latter. Thus, the seat is adjusted in height and in inclination angle, independently, by operating each of those two mechanisms, without coactive influences therebetween.

5 Claims, 2 Drawing Sheets

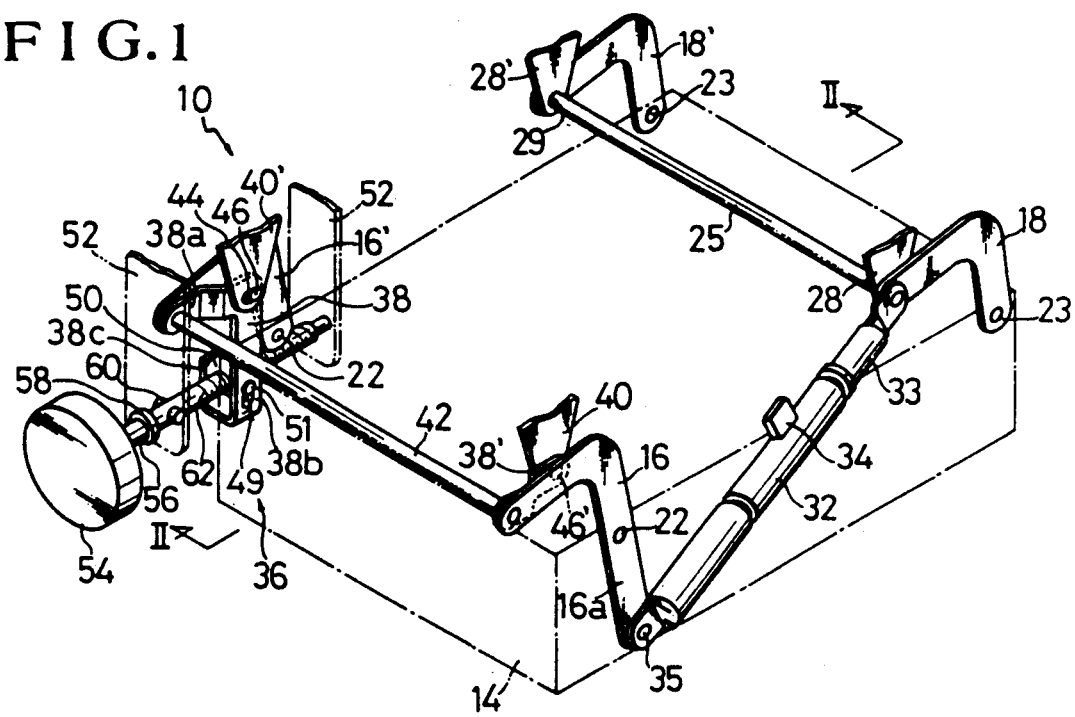
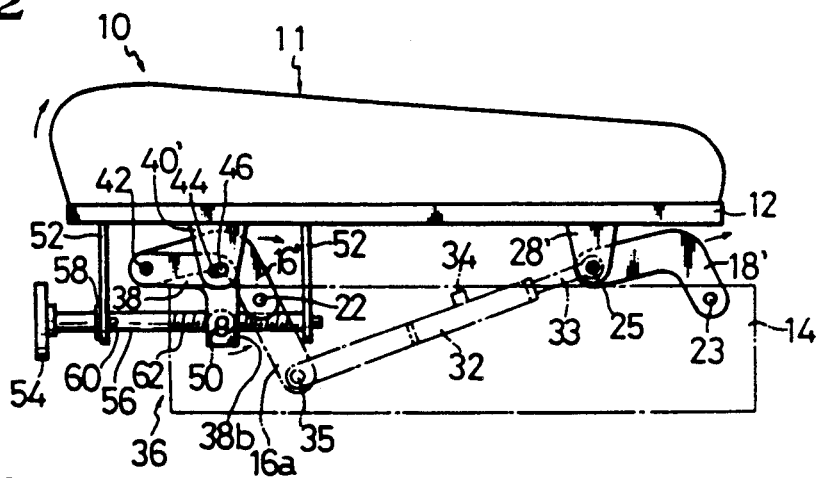
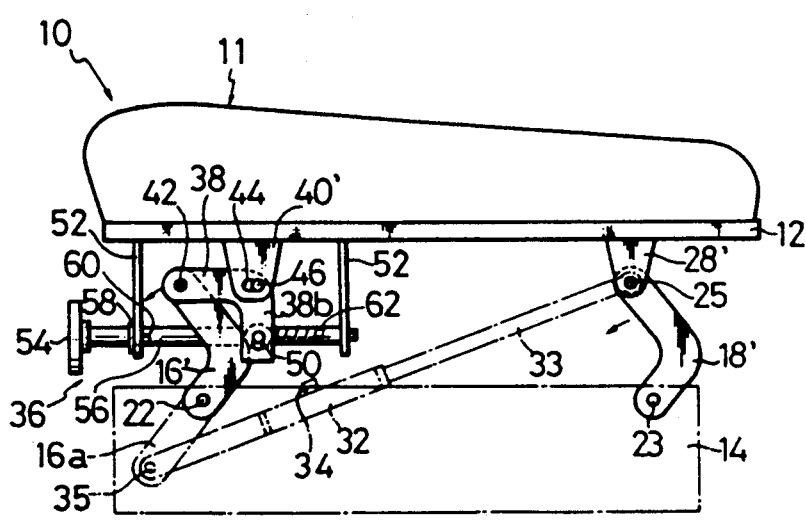

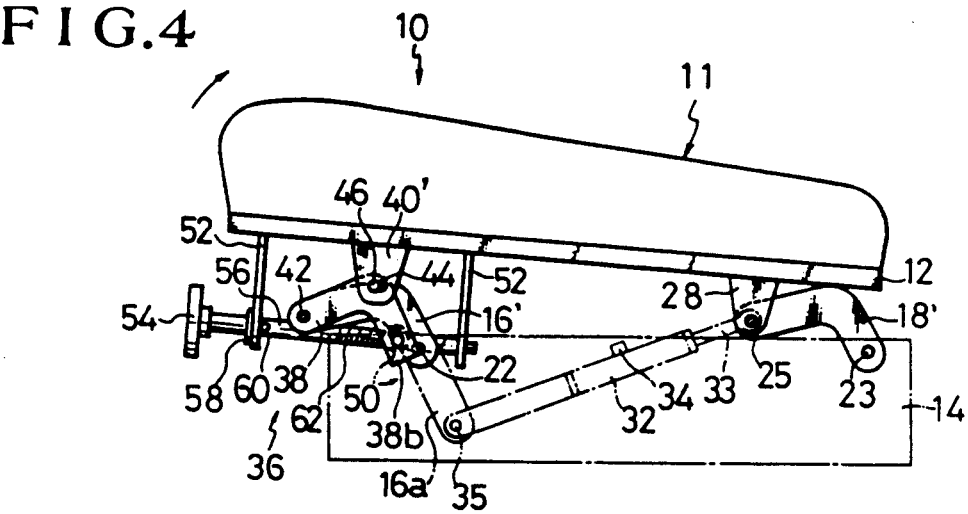

HEIGHT ADJUSTING DEVICE FOR VEHICLE SEAT

BACKGROUND OF THE INVENTION

1. Field of the Invention

The present invention relates to a height adjusting device for a vehicle seat which is adapted to adjust the height of the seat.

2. Description of Prior Art

In a vehicle seat, the height thereof is adjusted mechanically as desired according to the height of the occupant on the seat or what optimum eye level he or she wishes to set during driving of the vehicle, and for that purpose most of general seat adjusting devices are constructed such that the seat surface is to be moved vertically, keeping its horizontal line in parallel with the floor of the vehicle, utilizing a parallel linkage. Thus, in general, the seat frame is provided with a pair of forward link members and a pair of rearward link members, respectively, at its forward and rearward end parts, with those four link members being disposed in a parallel relation with one another.

In such parallel-linkage based seat height adjusting devices, however, a difficulty has been found its in terms of its seat surface inclination adjustment, because the seat surface has to be moved in a parallel way with respect to the floor of the vehicle. While some tilting mechanism can be installed therein, the problem is that such tilting mechanism needs to be equipped with the forward and rearward end part of the seat frame respectively so that, for example, to tilt the seat downwardly requires actuating one of the two tilting mechanisms and adjusting the other of them so as to leave it somewhat inactive, to thereby keep the parallel vertical movements of the seat.

A partial solution to such problem is found in the Japanese Laid-Open Utility Model Publication No. 56-28439 wherein there are disclosed a seat height adjusting means and a seat surface inclination adjusting means. However, according to this prior art, once the seat surface inclination has been adjusted, the seat height is not maintained in parallel with the floor of an automobile. In other words, the forward and rearward linkages between the seat frame and base bracket fixed to the floor are different in angle from each other, as a result of which the operation of the seat surface inclination adjusting means changes the inclination angle of the seat surface, which leaves its seat inclination angle to the seat height, and as such the seat surface inclination adjustment and parallel seat height adjustment can not be effected independently without their mutual co-active influences.

SUMMARY OF THE INVENTION

It is therefore a first purpose of the present invention to provide an improved height adjusting device for a vehicle seat, which permits separate and independent adjustments for seat height in a parallel relation with the floor of the vehicle and for seat surface inclination.

In achievement of the purpose, in accordance with the present invention there is provided a seat height adjusting mechanism having a pair of forward links arranged between forward brackets fixed on a seat frame and a seat base, and a pair of rearward links arranged between rearward brackets fixed on the seat frame and the seat base, and further there is provided a seat surface inclination adjusting mechanism including a tilt link which is disposed between the forward links and forward brackets, an adjustor nut connected with the tilt link, and a drive spindle having a threaded portion engaged threadedly with the adjustor nut. The tilt link is movable independently of the forward links in such a way to raise or lower the forward part of the seat frame with respect to the rearward links, permitting adjustment of inclination angle of the seat surface.

Accordingly, the seat is adjusted in height in a parallel relation with a floor of the vehicle by operation of the seat height adjusting mechanism, irrespective of the seat surface inclination adjusting mechanism; on the other hand, the seat surface is adjusted in inclination angle by operating the seat surface inclination adjusting mechanism, without mechanical coincidental influence upon the seat height adjusting mechanism. Thus, an occupant of the seat can adjust the seat height and seat surface inclination angle, individually, to match each of them to his or her seating preferences and tastes.

It is a second purpose of the present invention to provide an improved operationability of the above-mentioned seat surface inclination adjusting mechanism.

To attain the purpose, the drive spindle of the seat surface inclination adjusting mechanism is rotatably supported by a support bracket fixed on the seat frame in a manner in which dislocation in its longitudinal axial direction is prevent with an operation handle fixed on the drive spindle. The handle is disposed forwardly of the seat.

Accordingly, an occupant of the seat easily reach the handle and operate it at fixed certain point, regardless of the seat height and seat inclination angle being adjusted.

In another aspect of the invention, the tilt link of the seat surface inclination adjusting mechanism is simply connected with the linkage of the height adjusting mechanism and with the adjustor not engaged with the drive spindle, and therefore the height adjusting mechanism per se does not need modifying or improving in any special way, so that its structure is not complicated but is quite simple.

BRIEF DESCRIPTION OF THE DRAWINGS

FIG. 1 is a partly broken away perspective view of a height adjusting mechanism for a vehicle seat in accordance with the present invention, with which is provided a seat surface inclination adjusting mechanism;

FIG. 2 is an end elevation view taken along the line II—II in the FIG. 1, showing the seat height to be adjusted in a lowest level by the height adjusting mechanism;

FIG. 3 is an end elevation view in connection with FIG. 2, showing the seat height to be adjusted in a higher level;

FIG. 4 is an end elevation view in connection with FIG. 2, showing a state wherein the seat surface inclination adjusting mechanism is operated to incline the forward part of the seat upwardly;

FIG. 5 is an end elevation view in connection the FIG. 2, showing a state wherein the forward part of the seat is inclined downwardly; and FIG. 6 is an end elevation view in connection with FIG. 2, showing the set height to be adjusted to a highest level.

DETAILED DESCRIPTION OF PREFERRED EMBODIMENT OF THE INVENTION

Referring to FIGS. 1 and 2, there is shown a seat height adjusting device (10) which is adapted to adjust the height of the seat cushion (11). The seat height adjusting device (10) is constructed on the basis of a parallel linkage which is formed with a pair of L-shaped forward links (16)(16') and a pair of L-shaped rearward links (18)(18') such that the former links (16)(16') are at their lower ends rotatably, pivotally connected via pins (22) to the forward part of a seat base (14), and the latter links (18)(18') are likewise at their lower ends connected via pins (23) to the rearward part of the seat base (14). Further, a forward connecting rod (42) extends between the two forward links (16)(16'), with the upper ends of the links (16)(16') being connected rotatably to both ends of the connecting rod (42). Similarly a rearward connecting rod (25) extends between the two rearward links (18) (18'), with their upper ends connected rotatably to both ends of the connecting rod (25). Those two forward and rearward links are thus allowed to be respectively moved in a synchronized way via the connecting rods (22)(23).

As viewed from FIG. 1, the right-side forward link (16) has a longer lower leg extension part (16a). It is noted that the rotation or pivot point of the right-side forward link (16) is located at generally midway in its lower leg extension part (16a).

The seat cushion (11) is mounted upon a seat frame (12). As shown, the seat frame (12) has, provided at its bottom side, a pair of forward brackets (40)(40') and a pair of rearward brackets (28)(28'), each being dependent from the seat frame (12).

Through the holes (not clearly shown) of the two rearward brackets (28)(28') are respectively rotatably passed the both ends of the connecting rod (25), whereupon the rearward portion of the seat frame (12) is operatively connected with the pair of links (18)(18') via brackets (28)(28').

The forward brackets (40)(40') are each formed with an elongated hole (44)(44'), though the hole (44') is not shown, and those forward brackets (40) (40') are connected at their elongated holes (44)(44') with a tilt link (38) and an auxiliary tilt link (38') associated with a seat surface inclination adjusting mechanism (36), which will be explained later.

A telescopic stepless height adjusting/locking device (32) is provided between the right-side forward and rearward links (16)(18) in such a manner that its forward end is rotatably, pivotally connected via a pin (35) to the lower end of the forward link (16), whereas its rearward end is likewise connected to the forward end of the rearward link (18). The height adjusting/locking device (32) is a conventional one, in which the operation of its switch button (34) causes the movable section (33) to telescopically move forwards or backwards, thereby raising or lowering the four links (16)(16')(18)(18') for height adjustments of the seat cushion (11). A desired height of the seat cushion (11) is set and retained by operating the button (34).

The seat height adjusting device (10) in accordance with the present invention includes the seat surface inclination adjusting mechanism (36) for adjusting the vertical inclination of the seat cushion (11). The seat surface inclination adjusting mechanism (36) comprises a bell-crank-like tilt link (38), an auxiliary tilt link (38'), an adjustor nut (50), drive spindle (56) with a male threaded part (62), and a tilt operation handle (54). More specifically, in that mechanism (36), the tilt link (38) is composed essentially of a horizontal upper link portion (38a), a vertical lower link portion (38b) integral therewith, and a laterally L-like upturned portion (38c) extending from the lower end of the vertical lower link portion (38b), the portions (38b) and (38c) forming a U-shaped configuration as best seen in FIG. 1. At the lower end part of the lower link portion (38a), there is formed a vertically elongated hole (49), and a similar elongated hole (not shown) is also formed at the L-like upturned portion (38c) in an opposed relation with the former hole (49). The tilt link (38) is at its bent portion (between its upper and lower link portions (38a) (38b)) provided with a pin (46) which is slidably inserted through the horizontally elongated hole (44) of the left-side bracket (40'). Thus, the tilt link (38) is at the pin (46) connected with the bracket (40') in a rotatable and horizontally movable manner. In addition, the forward end of the upper link portion (38a) of the tilt link (38) is fixedly connected to one end of the connecting rod (42). The auxiliary tilt link (38') is formed similarly in shape to the upper link portion (38a) of the tilt link (38), and connected fixedly to the other end of the connecting rod (42), extending therefrom at the same angle with and in parallel with that upper link portion (38a). The rearward end (see FIG. 1) of the auxiliary tilt link (38') is formed with a pin (46') projecting inwardly thereof, which is similar to the pin (46) of the tilt link (38). Such pin (46') is slidably inserted through the horizontally elongated hole of the bracket (40). Thus, the two forward brackets (40)(40'), in contrast to the rear ones (28)(28'), are connected with those tilt link (38) and auxiliary tilt link (38').

In the L-like upturned portion (38c) of the tilt link (38), there is provided the adjustor nut (50) such that both its support pins (51) are slidably inserted through the two vertically elongated holes (49), the adjustor nut (50) having a female threaded hole with which is threadedly engaged with the male threaded portion (62) of the drive spindle (56). The drive spindle (56) is rotatably supported by the two support brackets (52) fixed to the seat frame (12), with the operation handle (54) provided on the forward end of the spindle (56). it is noted that the handle (54) is disposed forwardly of the seat cushion (12) as seen in FIG. 2 so that an occupant on the seat cushion (12) may reach the handle (54) easily at his or her front side. A stopper ring (58) is fixed on the spindle (56) such as to be disposed outside the support bracket (52), and a stopper pin (60) is fixed on the spindle (56) as shown, disposed inside the support bracket (52). By virtue of those two stopper elements, the spindle (56) is permitted to be rotated only about its axis while being prevented against movements in its longitudinal axis.

Now, a description will be made of the operation of the above-described device.

Reference is firstly made to FIG. 2, in which is shown an initial position of the seat cushion (11) wherein the seat cushion (11) is set at a lowest level in a parallel relation with the seat base (14). In that state, with the operation of the height adjusting mechanism (32) by means of the button (34) for unlocking purpose, its movable section (33) is then caused to move forwards, pushing respectively the forward and rearward links (16)(18), to thereby rotatively raise the forward upper ends of both links (16)(18) in the clockwise arrow direction, so that, by the reason that the upper link portion (38a) of the tilt link (38) and auxiliary tilt link (38') are extended in parallel with the seat base (14), the seat cushion (11) is moved upwardly at the two connecting points as indicated at (46)(25), keeping a parallel relation of the seat cushion (11) with the seat base (14).

FIG. 3 shows that the seat cushion (11) is raised at a highest level, with the foregoing height adjustment operation, and locked there by locking operation of the height adjusting mechanism (32) to keep inactive the links (15)(18).

When it is desired to lower the seat cushion (11) form the raised state as in FIG. 3, the adjusting mechanism (32) is operated to release it from the locked state, and a relatively great downward load is given to the seat cushion (11), causing return of the movable section (33) of the mechanism (32) to its initial lowered point as shown in FIG. 2, with the result that the links (16)(16')(18)(18') are rotated in the counterclockwise arrow direction as shown in FIG. 3 to the position shown in FIG. 2.

It is therefore seen that the seat cushion (11) is adjustably moved in vertical directions, retaining a horizontal seating surface, with the above-mentioned parallel linkage and height adjusting/locking mechanism (30).

Referring now to FIGS. 4 and 5, a statement is made as to the operation of the seat surface inclination adjusting mechanism (36), under the initial height state of the seat cushion (11) shown in FIG. 2.

According to this particular mechanism (36), the rotation of the operation handle (54) causes the adjustor nut (50) to move along the longitudinal axis of the threaded portion (62) of the drive spindle (56) by virtue of the threaded engagement between the male threaded portion (62) and female threaded hole of the adjustor nut (50). As is understandable, the mechanism (36) is adapted to cause upward or downward inclination of the seat cushion (11) to match the seating condition thereof to the taste or preference of an occupant of the seat in addition to the horizontal height adjustment of the seat cushion (11).

In FIG. 4, in order for the seat cushion (11) to be inclined with its forward portion upwardly, the operation handle (54) is rotated to cause the adjustor nut (50) to move in a rearward direction towards the rearward side of the seat cushion (11), thereby causing the tilt link (38) to rotate about the forward connecting rod (42) in the counterclockwise arrow direction. Such rotation of the tilt link (38) in turn causes the forward portion of the seat cushion (11) to rotate in the clockwise arrow direction with respect to the rearward connecting rod (25). In other words, with the adjustor nut (50) being moved rearwardly along the axis of the drive spindle (56), the lower end of the tilt link (38) is moved in the same direction and simultaneously the forward connecting point at (46) between the tilt link (38) and forward bracket (40) is displaced upwardly in relation to the rearward connecting point at (25) between the rearward bracket (28) and rearward link (18). Accordingly, the forward portion of the seat cushion (11) is adjustably inclined upwardly relative to that rearward point (25) under the lowest initial height state of the seat cushion (11).

Then, a reverse rotation of the handle (54) leads to the return of thus-upwardly-inclined seat cushion (11) to the initial horizontal state, due to the reason that the adjustor nut (50) is moved forwardly along the drive spindle (56) to thereby cause the lower link portion (38a) of the tilt link (38) to rotate back to the initial vertical position as in FIG. 2, and thus the forward connecting point (46) is displaced to the same level with that of the rearward connecting point (25).

In FIG. 5, to the contrary, in order to incline the seat cushion (11) downwardly, the operation handle (54) is rotated to cause the adjustor nut (50) to move forwardly from its initial position in a direction towards the forward side of the seat cushion (11), which causes, in turn, the rotation of the tilt link (38) about the connecting rod (38) in the same direction. As a result, the forward connecting point (46) is displaced downwardly in relation to the rearward connecting point (25), and thus the forward portion of the seat cushion is inclined downwardly relative to the rearward connecting point (25), as indicated by the arrow.

Although not shown, apparently the auxiliary tilt link (38') is moved in synchronization with the above-stated motions of the tilt link (38) via the connecting rod (42), serving to raise or lower the seat cushion (11).

FIG. 6 shows that the seat cushion (11) is raised from the position of FIG. 4 to a highest level by the seat height adjusting/locking mechanism (32), and at such highest level, the seat cushion (11) is inclined upwardly by the seat surface inclination adjusting mechanism (36).

From the review of FIGS. 4 to 6, it will be appreciated that the height adjusting mechanism (30) and seat surface inclination adjusting mechanism (36) are to be operated independently of each other, and therefore the height adjustment of the seat cushion (11) has no influence upon the seat surface inclination of the same; namely, the seat height adjustment is solely effected without any coincidental change of the seat surface inclination adjustment, or the seat surface inclination is solely adjusted with no correlative change of the seat height.

Further, the seat surface inclination adjustment is effected in a stepless way due to the threaded engagement between the drive spindle (56) and adjustor nut (50). Since the handle (54) is rotatably supported by the support brackets (52) in a manner preventing the spindle (56) from dislocation in its longitudinal axial direction, an occupant on the seat cushion (11) may easily operate the handle (54) at a certain point, regardless of the seat height and seat surface inclination angle.

Still further, the seat surface inclination adjusting mechanism (36) is attached to the height adjusting mechanism (10) simply via the two forward brackets (40)(40') and the forward connecting rod (42) and therefore, the height adjusting mechanism (10) per se remains without modification or improvement in design, so that its structure is not complicated due to the seat surface inclination adjusting mechanism (36).

While having described the invention as above, it should be understood that it is not limited to the illustrated embodiment, but may be subject to other various modifications, replacements and additions in structure, without departing from the spirit and scope of the appended claims. For instance, in place of the height adjusting/locking mechanism (32), other proper means may be utilized. The linkage (16)(16')(18)(18') is not limited to the "L" shape, and may be formed in any other shape inasmuch as it shows a parallel link motion. An elongated hole same with the one (44) may be formed at each of the two rearward brackets (28)(28'), instead of forming it in that hole (44). The seat surface inclination adjusting mechanism (36) may be provided at the rearward links (18)(18') instead of at the forward links (16)(16').

What is claimed is:

1. A height adjusting mechanism for a vehicle seat, comprising:
   a seat frame;
   a seat base disposed under said seat frame;
   a pair of forward links and a pair of rearward links which are movably provided between said seat frame and seat base;
   a seat height adjusting means provided between said forward and rearward links, said seat height adjusting means being adapted to cause vertical movement of said forward and rearward links in an adjustable manner, thereby adjusting vertical position of said seat frame; and
   a seat surface inclination adjusting means adapted to adjust the inclination of seat surface of said seat, wherein a tilt link is included therein and, with said tilt link, one of said forward and rearward links is raised or lowered, thereby causing adjustable vertical movement of a forward portion of said seat;
   said seat height adjusting means being provided independently of said seat surface inclination adjusting means;
   wherein said seat surface inclination adjusting means comprises a pair of tilt links provided between said seat frame and one of said forward and rearward links, an adjustor nut mounted movably in one of said pair of tilt links, and a drive spindle having a threaded portion formed circumstantially thereof which is threadedly engaged with said adjustor nut, said drive spindle being rotatably attached to said seat frame in a manner being prevented against movement in its longitudinal axial direction and being further at its forward end provided with an operation handle; and
   wherein said seat frame is provided with a pair of forward brackets at its forward portion and a pair of rearward brackets at its rearward portion, wherein said pair of forward brackets are each formed with a horizontally elongated hole, wherein a connecting rod extends between said pair of forward links and between said pair of tilt links, wherein one end respectively of said two tilt links is fixed on said connecting rod, while a central portion respectively of said two tilt links, which is provided with a pin, is movably connected with each of said two forward brackets such that said pins of said tilt links are respectively inserted movably through said horizontally elongated holes, and wherein said pair of forward links are at their respective one end connected rotatably to said connecting rod.

2. The height adjusting mechanism according to claim 1, wherein said pair of forward and rearward links are each formed in a substantially L-shaped configuration, except that one of said pair of forward links has a lower extension part, wherein said forward and rearward links are at end portions thereof rotatably, pivotally connected to said seat base, except that one of said forward links has, formed at its lower end portion, a lower extension part which extends downwardly below a pivot point of said one of said forward links, and wherein said seat height adjusting means is arranged between said lower extension part of said forward link and an upper end of one of said two rearward links.

3. The height adjusting mechanism according to claim 1, wherein said seat height adjusting means includes a telescopically extendable adjusting/locking mechanism which is capable of a stepless height adjustment of said seat.

4. The height adjusting mechanism according to claim 1, wherein said pair of tilt links comprise a bell-crank-like tilt link and an auxiliary tilt link, wherein said bell-crank-like tilt link is at its lower link portion formed with a generally L-like upturned portion, and wherein said adjustor nut is disposed within said L-like upturned portion of said bell-crank-like tilt link.

5. The height adjusting mechanism according to claim 1, wherein said operation handle of said drive spindle is disposed under and forwardly of said seat.

* * * * *